United States Patent
Vallius et al.

(10) Patent No.: US 9,671,615 B1
(45) Date of Patent: Jun. 6, 2017

(54) EXTENDED FIELD OF VIEW IN NEAR-EYE DISPLAY USING WIDE-SPECTRUM IMAGER

(71) Applicant: Microsoft Technology Licensing, LLC, Redmond, WA (US)

(72) Inventors: Tuomas Vallius, Espoo (FI); Pasi Petteri Pietilae, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/955,273

(22) Filed: Dec. 1, 2015

(51) Int. Cl.
  *G02B 27/42* (2006.01)
  *G02B 27/01* (2006.01)
  *G06T 19/00* (2011.01)

(52) U.S. Cl.
  CPC ..... *G02B 27/4205* (2013.01); *G02B 27/0172* (2013.01); *G06T 19/006* (2013.01); *G02B 2027/014* (2013.01); *G02B 2027/0112* (2013.01); *G02B 2027/0123* (2013.01)

(58) Field of Classification Search
  None
  See application file for complete search history.

(56) References Cited

U.S. PATENT DOCUMENTS

| | | |
|---|---|---|
| 5,751,388 A | 5/1998 | Larson |
| 6,140,980 A | 10/2000 | Spitzer et al. |
| 8,233,204 B1 * | 7/2012 | Robbins ............... G02B 5/1828 345/7 |
| 8,482,859 B2 | 7/2013 | Border et al. |
| 8,681,184 B2 | 3/2014 | Seesselberg et al. |
| 8,989,535 B2 | 3/2015 | Robbins |

(Continued)

FOREIGN PATENT DOCUMENTS

| | | |
|---|---|---|
| CN | 103995354 A | 8/2014 |
| WO | 9504294 A2 | 2/1995 |
| WO | 2013167864 A1 | 11/2013 |

OTHER PUBLICATIONS

"Waveguide-based Displays Maturing for Augmented Reality Applications", Retrieved on: Jul. 15, 2015, Available at: http://www.displaydaily.com/articles/446-sponsored-articles/14132-waveguide-based-displays-maturing-for-augmented-reality-applications (5 pages total).

(Continued)

*Primary Examiner* — Maurice L McDowell, Jr.
(74) *Attorney, Agent, or Firm* — Mark K. Young; Mayer & Williams PC

(57) ABSTRACT

In a near-eye optical display system comprising a waveguide and diffractive optical elements (DOEs) configured for in-coupling, exit pupil expansion, and out-coupling, a wide-spectrum imager generates imaging light that is in-coupled to the system with an input pupil having an extended field of view (FOV). Wide-spectrum imaging light impinges on the in-coupling DOE over a range of incidence angles. As chromatic dispersion in the in-coupling DOE causes different wavelengths to propagate with different angles, for a given input pupil incidence angle, at least a portion of the imaging light spectrum meets a critical angle condition that enables propagation with total internal reflection (TIR) in the waveguide without leakage to the outside. Thus, different parts of the imaging light spectrum can be used for different regions of the FOV.

20 Claims, 12 Drawing Sheets

(56) References Cited

U.S. PATENT DOCUMENTS

| | | | | |
|---|---|---|---|---|
| 9,244,280 B1* | 1/2016 | Tiana | ................ | G02B 27/0172 |
| 2002/0085175 A1* | 7/2002 | Butler | ................ | G02B 27/017 |
| | | | | 351/221 |
| 2003/0202247 A1* | 10/2003 | Niv | ................ | G02B 5/1866 |
| | | | | 359/569 |
| 2004/0109234 A1 | 6/2004 | Levola | | |
| 2009/0201589 A1* | 8/2009 | Freeman | ............ | G02B 27/0103 |
| | | | | 359/630 |
| 2010/0296163 A1 | 11/2010 | Saarikko | | |
| 2013/0222384 A1 | 8/2013 | Futterer | | |
| 2013/0314789 A1* | 11/2013 | Saarikko | ............ | G02B 27/0081 |
| | | | | 359/489.07 |
| 2014/0104665 A1 | 4/2014 | Popovich et al. | | |
| 2014/0140654 A1 | 5/2014 | Brown et al. | | |
| 2014/0300695 A1 | 10/2014 | Smalley et al. | | |
| 2015/0092042 A1* | 4/2015 | Fursich | ................ | B60R 1/00 |
| | | | | 348/115 |

OTHER PUBLICATIONS

"International Search Report & Written Opinion Issued in PCT Application No. PCT/US2016/062627", Mailed Date: Feb. 1, 2017, 13 Pages.

* cited by examiner

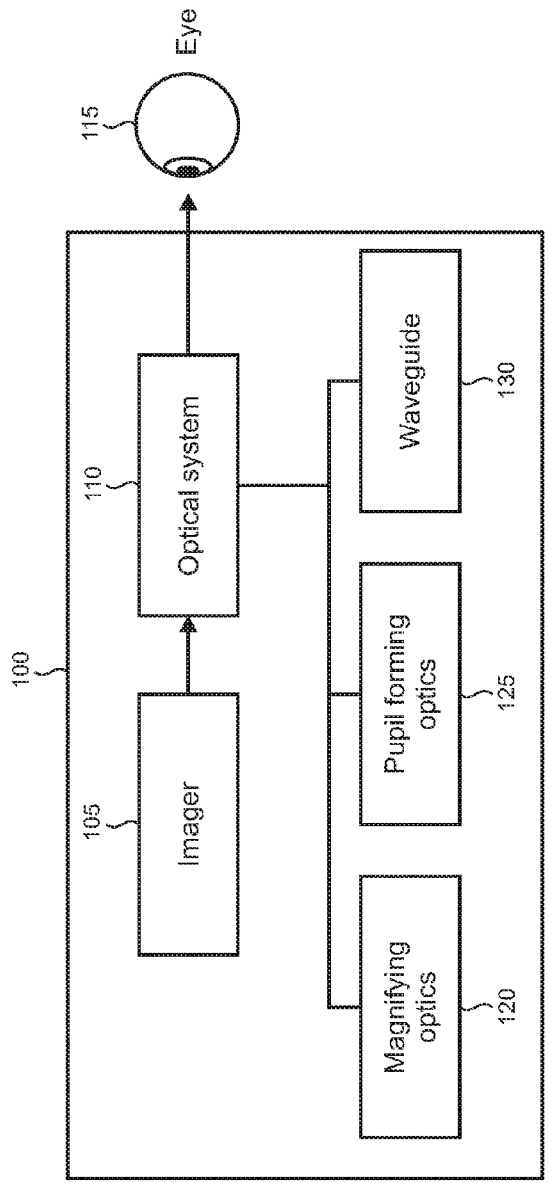

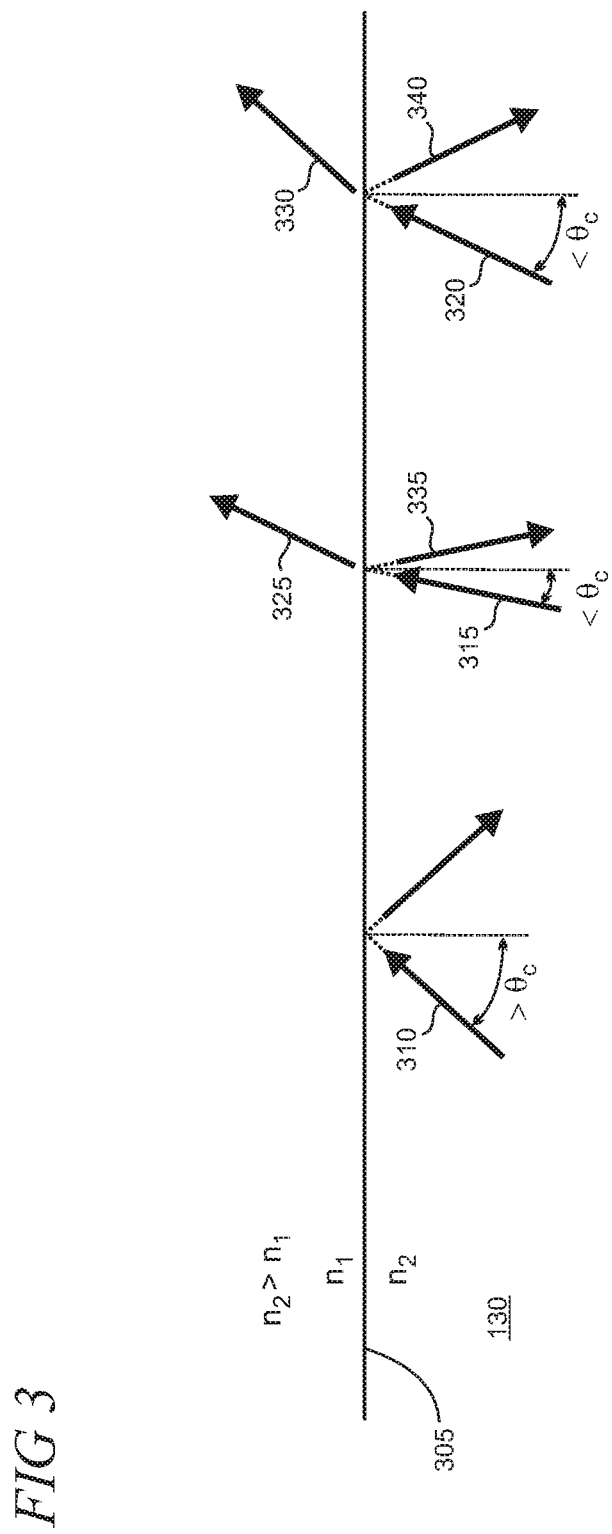

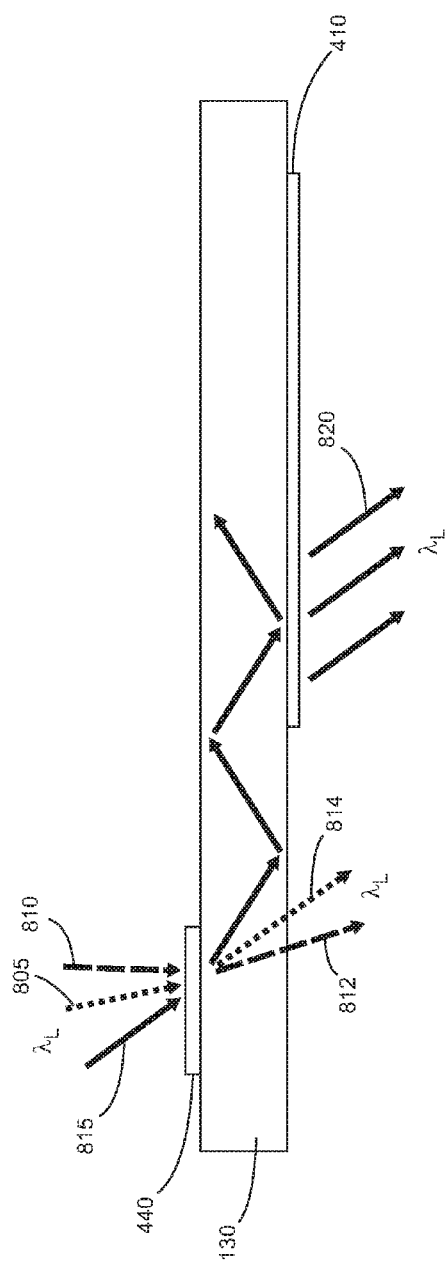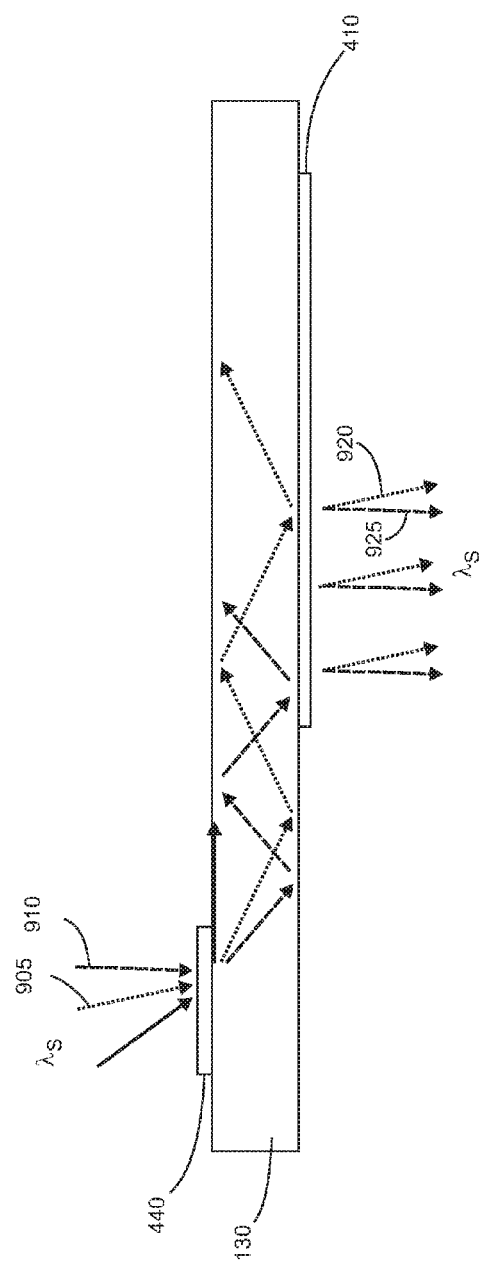

US 9,671,615 B1

EXTENDED FIELD OF VIEW IN NEAR-EYE DISPLAY USING WIDE-SPECTRUM IMAGER

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

In a near-eye optical display system comprising a waveguide and diffractive optical elements (DOEs) configured for in-coupling, exit pupil expansion, and out-coupling, a wide-spectrum imager generates imaging light that is in-coupled to the system with an input pupil having an extended field of view (FOV). Wide-spectrum imaging light impinges on the in-coupling DOE over a range of incidence angles. As chromatic dispersion in the in-coupling DOE causes different wavelengths to propagate with different angles, for a given input pupil incidence angle, at least a portion of the imaging light spectrum meets a critical angle condition that enables propagation with total internal reflection (TIR) in the waveguide without leakage to the outside. Compensation for the chromatic dispersion caused at the in-coupling DOE is performed at the out-coupling DOE. Thus, different parts of the imaging light spectrum can be used for different regions of the FOV. For example, the long part of the imaging light spectrum may be coupled into the waveguide for some angles of the FOV while the short part of the spectrum may be used to fill in the rest of the FOV and the overall FOV can be significantly increased as compared to narrow-spectrum imaging.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 1 shows a block diagram of an illustrative near-eye display system with an extended field of view (FOV) using a wide-spectrum imager;

FIG. 2 shows propagation of light in a waveguide by total internal reflection (TIR);

FIG. 3 shows a critical angle above which TIR in a waveguide occurs;

FIG. 8 shows long wavelength light being coupled into a waveguide in which TIR propagation is dependent on incidence angle at an in-coupling DOE;

FIG. 9 shows short wavelength light being coupled into a waveguide over a range of incidence angles at an in-coupling DOE and propagating in TIR;

Like reference numerals indicate like elements in the drawings. Elements are not drawn to scale unless otherwise indicated.

DETAILED DESCRIPTION

Figure 4:
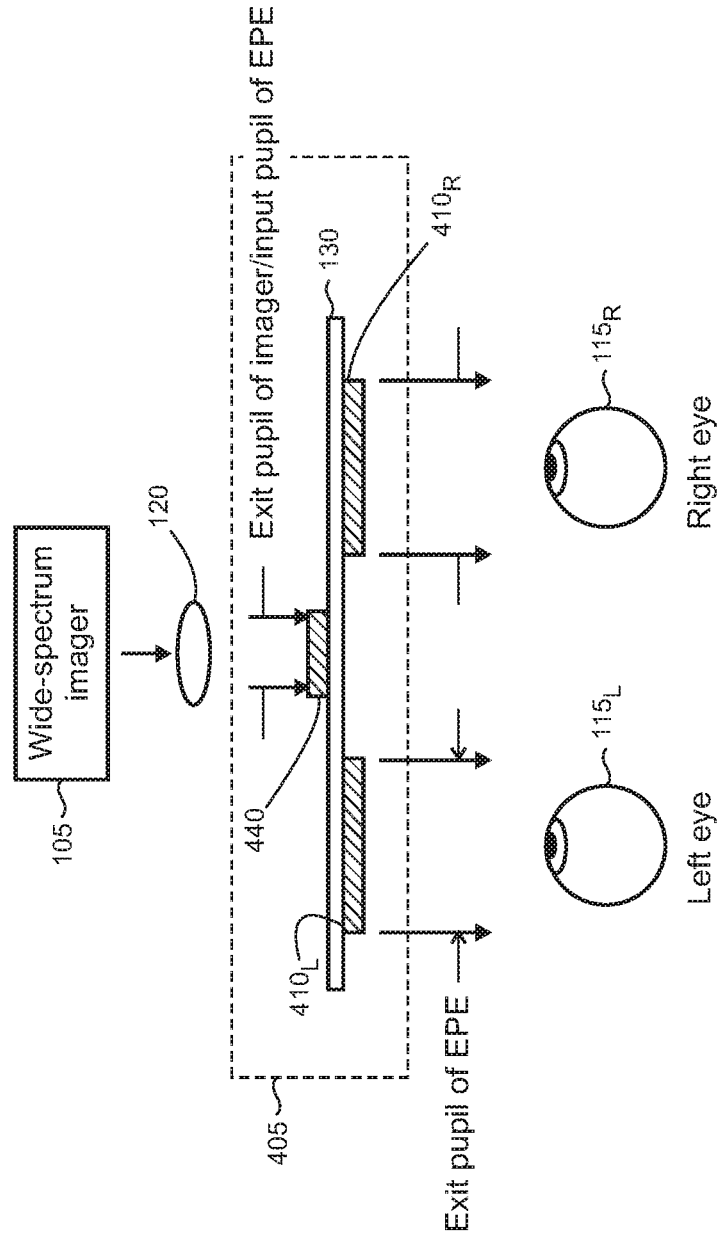
FIG. 4 shows a view of an illustrative exit pupil expander.

FIG. 1 shows a block diagram of an illustrative near-eye display system 100 which may incorporate a wide-spectrum imager. In an illustrative embodiment, the near-eye display system uses a combination of diffractive optical elements (DOEs) that provide in-coupling of incident light into a waveguide, exit pupil expansion in two directions, and out-coupling of light out of the waveguide. Near-eye display systems are frequently used, for example, in head mounted display (HMD) devices in industrial, commercial, and consumer applications. Other devices and systems may also use near-eye systems with wide-spectrum imagers, as described below. The near-eye display system 100 is an example that is used to illustrate various features and aspects, and the wide-spectrum imager is not necessarily limited to near-eye display systems using DOEs.

System 100 may include a wide-spectrum imager 105 that works with an optical system 110 to deliver images as a virtual display to a user's eye 115. The wide-spectrum imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130. In a particular non-limiting example, the wide-spectrum imager is configured to utilize an optical spectrum of approximately 40 nm in width. The imager 105 may include or incorporate an illumination unit (not shown) that may be configured to provide illumination in a range of wavelengths and intensities in some implementations.

In a near-eye display system the imager does not actually shine the images on a surface such as a glass lens to create the visual display for the user. This is not feasible because the human eye cannot focus on something that is that close. Rather than create a visible image on a surface, the near-eye optical system 100 uses the pupil forming optics 125 to form a pupil and the eye 115 acts as the last element in the optical chain and converts the light from the pupil into an image on the eye's retina as a virtual display.

The waveguide 130 facilitates light transmission between the imager and the eye. One or more waveguides can be utilized in the near-eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the head, leaving only a relatively small, light, and transparent waveguide optical element in front of the eyes.

In an illustrative implementation, the waveguide 130 operates using a principle of total internal reflection (TIR), as shown in FIG. 2, so that light can be coupled among the various optical elements in the system 100. As shown in FIG. 3, where n is the refractive index, a light ray 310 can propagate in TIR within the waveguide 130 when the angle of incidence exceeds a critical angle $\theta_c$ relative to the normal at the boundary 305 between the waveguide 130 and the less optically dense medium (e.g., air). For incidence angles less than $\theta_c$, as illustrated by rays 315 and 320, some of the light is refracted out of the waveguide (rays 325 and 330) and some light is reflected at the boundary 305 (rays 335 and 340). Accordingly, the propagation angles may be limited within waveguides in conventional near-eye display systems because light at angles outside of the TIR limits will leak out of the waveguide.

Conventional solutions that address the propagation angle limitations of TIR in a waveguide include increasing the refractive index, n, of the waveguide in order to decrease the magnitude of the critical angle $\theta_c$ so that a wider range of propagation angles is supported. However, materials with high refractive index are limited and the use of some, such as optical glasses, can be expensive while adding weight to a given system. A wider range of angles may also be accommodated by handling different ranges using different waveguide plates. But this solution also adds cost while increasing bulk, weight, and system complexity.

Continuing with the description of the present near-eye display system, FIG. 4 shows a view of an illustrative exit pupil expander (EPE) 405. EPE 405 receives an input optical beam from the wide-spectrum imager 105 through magnifying optics 120 to produce one or more output optical beams with expanded exit pupil in one or two directions relative to the exit pupil of the imager (in which the exit pupil of the imager corresponds to the input pupil of the EPE). In general, the input may include more than one optical beam which may be produced by separate sources. The expanded exit pupil typically facilitates a virtual display to be sufficiently sized to meet the various design requirements of a given optical system, such as image resolution, field of view, and the like, while enabling the imager and associated components to be relatively light and compact.

The EPE 405 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 4 for sake of clarity in exposition. The EPE 405 utilizes two out-coupling gratings, 410$_L$ and 410$_R$ that are supported on a waveguide 130 and a central in-coupling grating 440. The in-coupling and out-coupling gratings may be configured using multiple DOEs, as described in the illustrative example below. While the EPE 405 is depicted as having a planar configuration, other shapes may also be utilized including, for example, curved or partially spherical shapes, in which case the gratings disposed thereon are non-coplanar.

Figure 5:
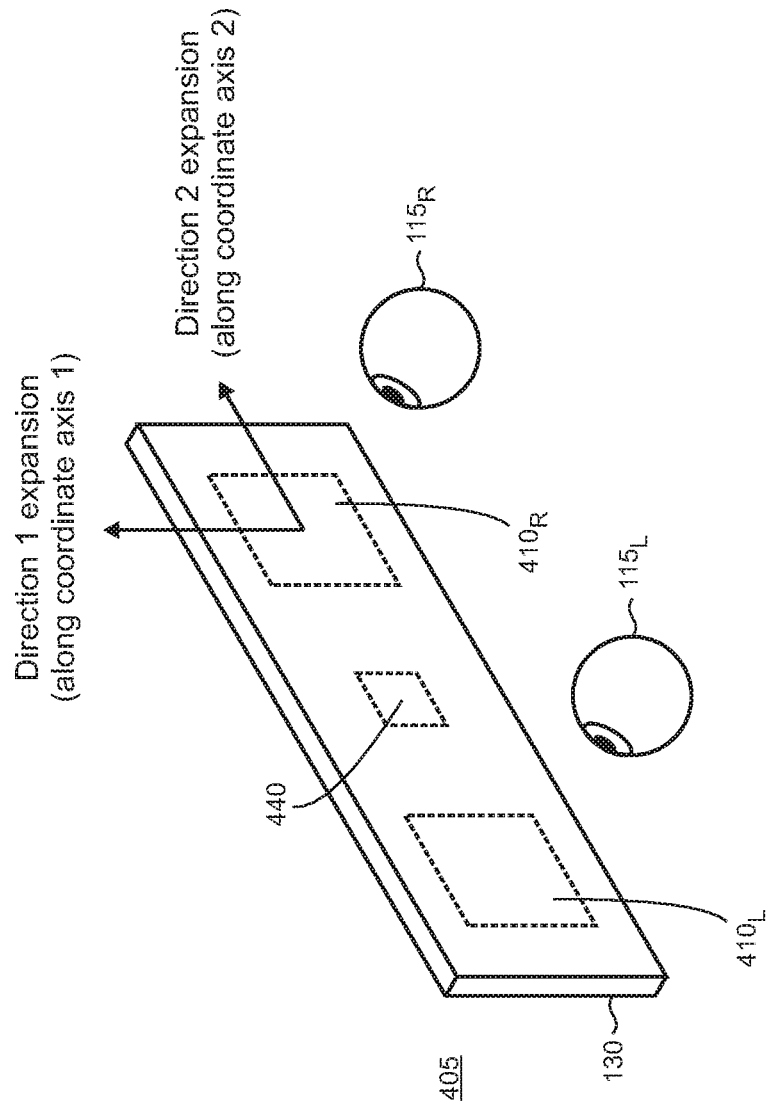
FIG. 5 shows a view of the illustrative exit pupil expander in which the exit pupil is expanded along two directions.

As shown in FIG. 5, the EPE 405 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of the near-eye display system with wide-spectrum imager.

Figure 6:
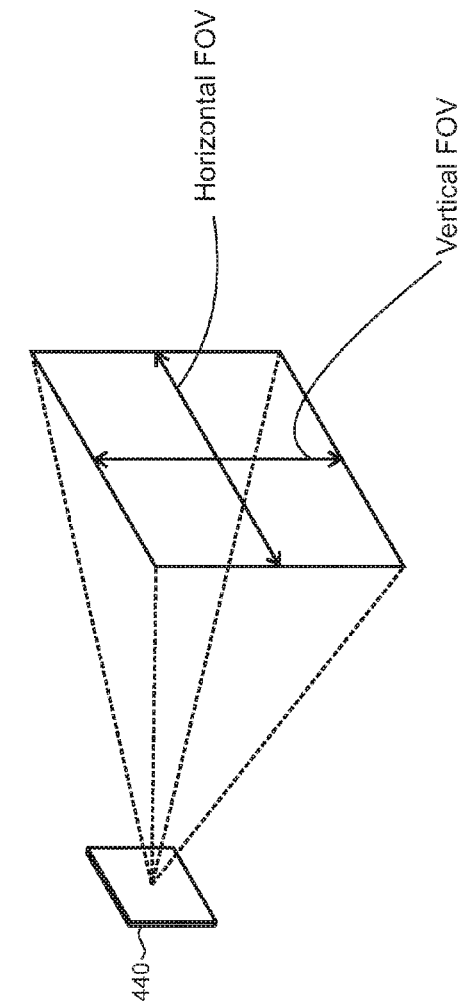
FIG. 6 shows an illustrative input pupil to an exit pupil expander in which the FOV is described by horizontal and vertical angles.

The input pupil to the EPE 405 at the in-coupling grating is generally described in terms of FOV, for example, using horizontal FOV and vertical FOV as shown in FIG. 6. In optical display systems using conventional narrow-imaging the horizontal and vertical FOV can respectively be, for example, 30×17 degrees. In comparison, the present near-eye optical system using wide-spectrum imaging can extend the FOV by an additional 30-50% in some applications without increasing the system cost as may occur using conventional solutions that involve material changes and/or additional components such as waveguide plates.

Figure 7:
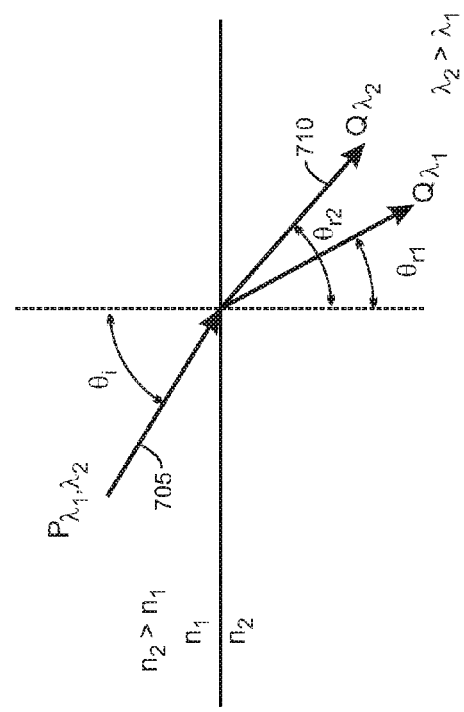
FIG. 7 shows chromatic dispersion in which a phase velocity of light in a DOE is wavelength dependent.

The FOV of the input pupil may be extended by using the chromatic dispersion that occurs in the optical system. As illustrated in FIG. 7, chromatic dispersion is a phenomenon in which the phase velocity of a wave in a given medium is dependent on its wavelength. Thus, for example, a ray P (indicated by reference numeral 705) traveling from a less optically dense medium to a more optically dense medium at an incidence angle of $\theta_i$ with respect to the normal will have a different angle of refraction depending on its wavelength. A refracted ray Q (710) will have a more acute refraction angle $\theta_r$ for shorter wavelengths and less for longer wavelengths. That is, shorter wavelengths are bent more towards the normal and the effective refractive index of the medium/material increases for those wavelengths. In addition to chromatic dispersion being a function of material properties (referred to as bulk material dispersion), chromatic dispersion may also result from structural features and geometries including, for example, in the in-coupling grating and/or other DOEs (referred to as waveguide dispersion).

FIG. 8 shows imaging light from the wide-spectrum imager 105 (FIG. 1) at a wavelength $\lambda_L$ that is from the longer part of the imaging light spectrum. The imaging light impinges on the in-coupling grating 440 at various angles, each depicted in the drawing using different lines (solid and dashed). As shown, the in-coupling grating couples the incident rays into the waveguide 130 at different angles. For rays 805 and 810, the angle of incidence relative to the plane of the in-coupling grating is too steep to enable the light to propagate within the waveguide in TIR and thus leaks out of the waveguide, as indicated by reference numerals 812 and 814. By comparison, the angle of incidence for ray 815 is sufficiently shallow with respect to the in-coupling plane so that when it enters the waveguide, its angle of propagation meets the TIR condition so that it can be output from the optical system at the out-coupling grating 410. As shown, the exit angles of the output rays 820 are parallel to the angle of the input ray 815.

FIG. 9 shows imaging light from the wide-spectrum imager 105 (FIG. 1) at a wavelength $\lambda_S$ that is from the shorter part of the imaging light spectrum. As in the illustrative example shown in FIG. 8, the imaging light in this case impinges on the in-coupling grating 440 at various angles, each depicted in the drawing using different lines (solid and dashed). Here, the shorter wavelengths are in-coupled and propagated at different angles compared to the longer wavelengths as a result of chromatic dispersion. Rays 905 and 910 (which are at the same angle of incidence to the in-coupling grating as rays 805 and 810 in FIG. 8) are thus able to propagate in TIR in the waveguide 130 and be out-coupled by the out-coupling grating 410, as indicated by reference numerals 920 and 925. The in-coupled and out-coupled rays are parallel, as in the example in FIG. 8.

Figure 10:
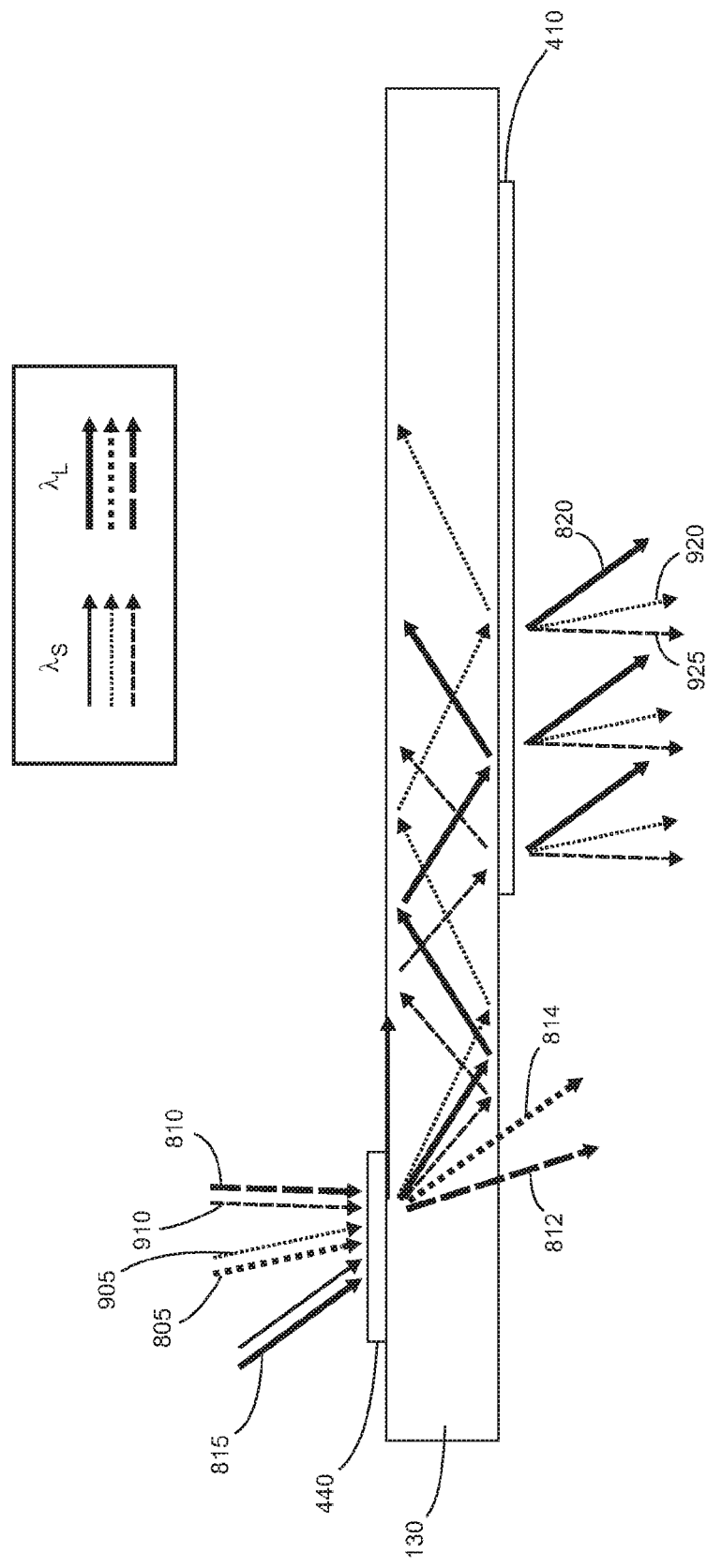
FIG. 10 shows wide-spectrum light being coupled into a waveguide over a wide angular input pupil at an in-coupling DOE and propagating in TIR.

Thus, by using the combination of rays from different parts of the wide-spectrum imaging light, the FOV of the input pupil includes the entire range of incidence angles at the in-coupling grating. The FOV angles that are not coupled into the waveguide at the long part of the imaging spectrum are coupled in the short part the spectrum thus filling the whole FOV. This is shown in FIG. 10 which combines the illustrations in FIGS. 8 and 9 into a single drawing. The chromatic dispersion occurring at the in-coupling grating is compensated for at the out-coupling grating. That is, the out-coupling grating is configured to cause chromatic dispersion in the opposite direction to that occurring at the in-coupling grating and the incidence angles of the rays at the input are maintained by the parallel rays at the output of the out-coupling grating. While a portion of the imager power is lost due to leakage from the waveguide (i.e., at some FOV angles of $\lambda_L$ in the example discussed above), the illumination unit of the imager may be configured to compensate so that the spectrum shifts slightly over the entire FOV and only the part of the spectrum that can propagate within the waveguide at each angle of the FOV, is used for that part of the FOV.

Figure 11:
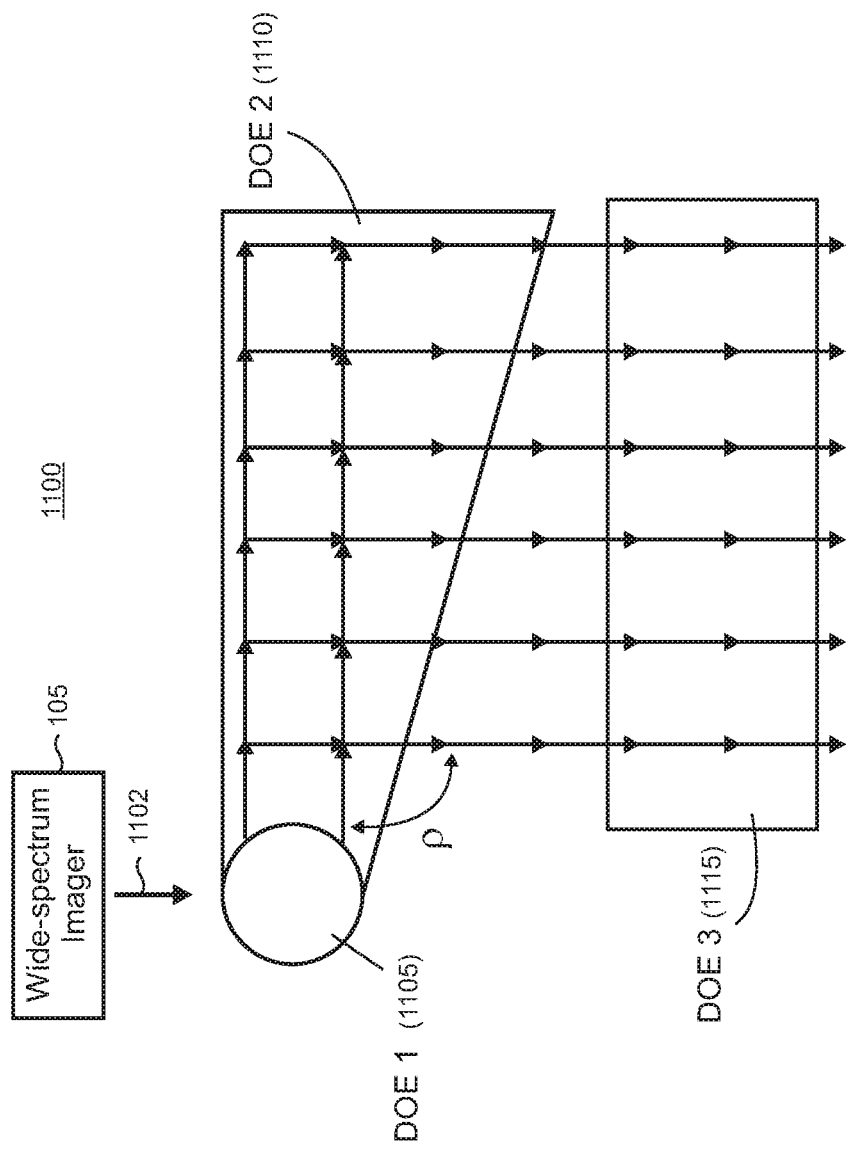
FIG. 11 shows an illustrative arrangement of three DOEs configured for in-coupling, exit pupil expansion, and out-coupling.

FIG. 11 shows an illustrative arrangement 1100 of three DOEs that may be used with, or as a part of, a waveguide to provide in-coupling, expansion of the exit pupil in two directions, and out-coupling in an EPE. Each DOE is an optical element comprising a periodic structure that can modulate various properties of light in a periodic pattern such as the direction of optical axis, optical path length, and the like. The first DOE, DOE 1 (indicated by reference numeral 1105), is configured to couple an imaging beam 1102 from the wide-spectrum imager 105 into the waveguide. The second DOE, DOE 2 (1110), expands the exit pupil in a first direction along a first coordinate axis, and the third DOE, DOE 3 (1115), expands the exit pupil in a second direction along a second coordinate axis and couples light out of the waveguide. The angle ρ is a rotation angle between the periodic lines of DOE 2 and DOE 3 as shown.

DOE 1 thus functions as an in-coupling grating and DOE 3 functions as an out-coupling grating while expanding the pupil in one direction. DOE 2 may be considered as an intermediate grating that functions to couple light between the in-coupling and out-coupling gratings while performing exit pupil expansion in another direction. Using such intermediate grating may eliminate a need for conventional functionalities for exit pupil expansion in an EPE such as collimating lenses.

Figure 12:
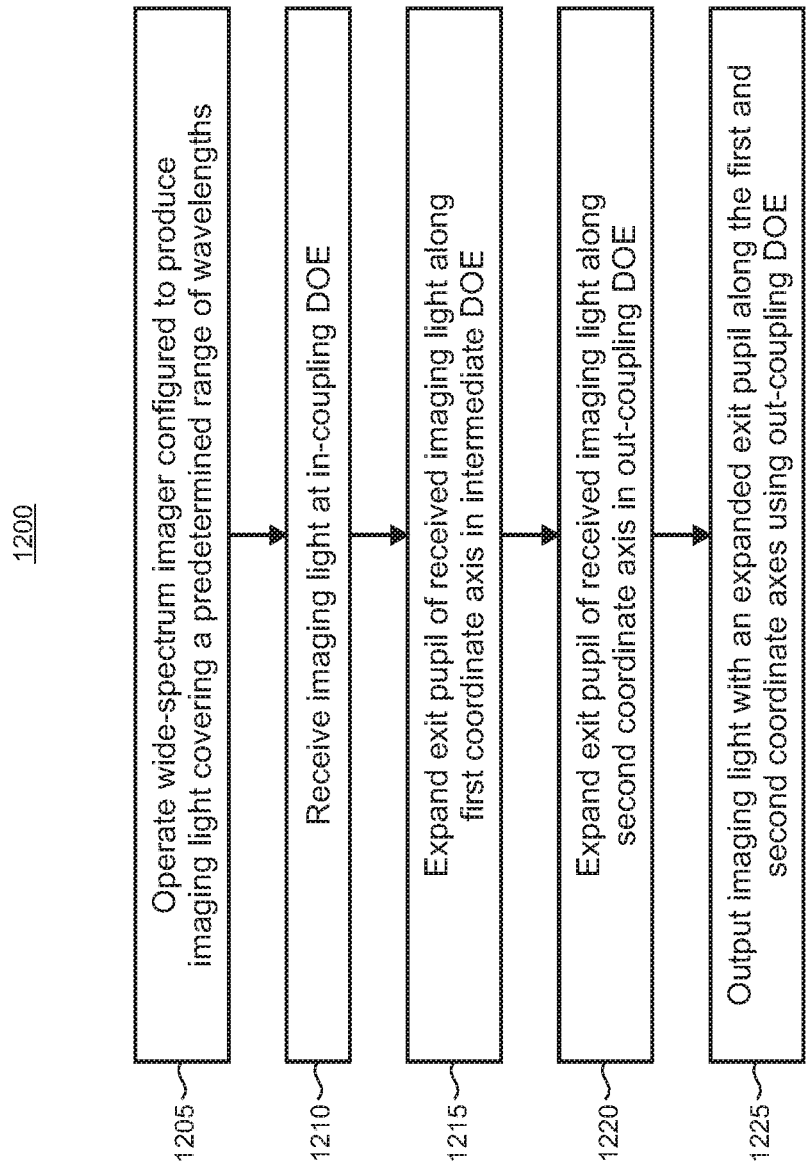
FIG. 12 shows an illustrative method.

FIG. 12 is a flowchart of an illustrative method 1200. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1205, a wide-spectrum imager is operated in which the imager is configured to produce imaging light cover a predetermined range of wavelengths. In step 1210, light is received at an in-coupling DOE. The in-coupling grating is disposed in an EPE and interfaces with the downstream intermediate DOE that is disposed in the EPE. In step 1215, the exit pupil of the received light is expanded along a first coordinate axis in the intermediate DOE. The intermediate DOE may be configured with gratings having an asymmetric profile such as slanted gratings or blazed gratings. In step 1220, the exit pupil is expanded in an out-coupling DOE which outputs light with an expanded exit pupil relative to the received light at the in-coupling DOE along the first and second coordinate axes in step 1225. The intermediate DOE is configured to interface with a downstream out-coupling DOE. In some implementations, the out-coupling DOE may be apodized with shallow gratings that are configured to be either straight or slanted.

Wide-spectrum imagers may be incorporated into a display system that is utilized in a virtual or mixed reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 13:
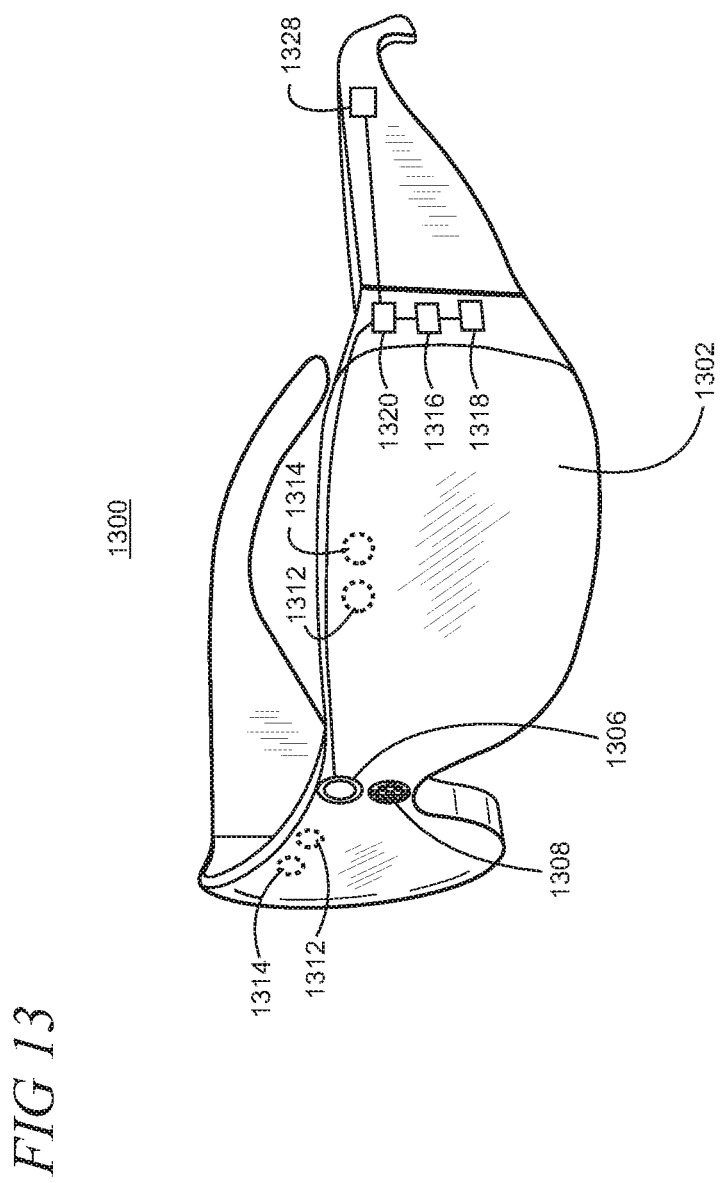
FIG. 13 is a pictorial view of an illustrative example of a virtual reality or mixed reality head mounted display (HMD) device.
Figure 14:
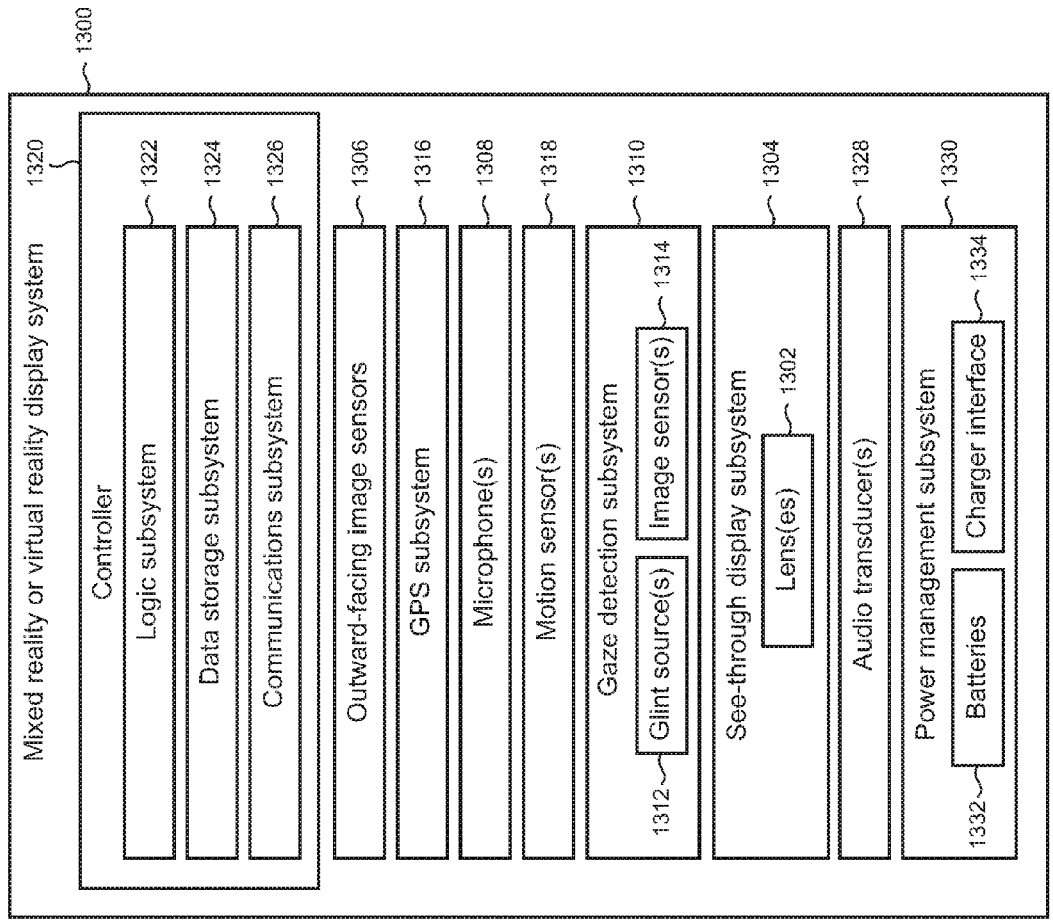
FIG. 14 shows a block diagram of an illustrative example of a virtual reality or mixed reality HMD device.

FIG. 13 shows one particular illustrative example of a see-through, mixed reality or virtual reality display system 1300, and FIG. 14 shows a functional block diagram of the system 1300. Display system 1300 comprises one or more lenses 1302 that form a part of a see-through display subsystem 1304, such that images may be displayed using lenses 1302 (e.g. using projection onto lenses 1302, one or more waveguide systems incorporated into the lenses 1302, and/or in any other suitable manner). Display system 1300 further comprises one or more outward-facing image sensors 1306 configured to acquire images of a background scene and/or physical environment being viewed by a user, and may include one or more microphones 1308 configured to detect sounds, such as voice commands from a user. Outward-facing image sensors 1306 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 1300 may further include a gaze detection subsystem 1310 configured for detecting a direction of gaze of each eye of a user or a direction or location of focus, as described above. Gaze detection subsystem 1310 may be configured to determine gaze directions of each of a user's eyes in any suitable manner. For example, in the illustrative example shown, a gaze detection subsystem 1310 includes one or more glint sources 1312, such as infrared light sources, that are configured to cause a glint of light to reflect from each eyeball of a user, and one or more image sensors 1314, such as inward-facing sensors, that are configured to capture an image of each eyeball of the user. Changes in the glints from the user's eyeballs and/or a location of a user's pupil, as determined from image data gathered using the image sensor(s) 1314, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1310 may have any suitable number and arrangement of light sources and image sensors. In some implementations, the gaze detection subsystem 1310 may be omitted.

The display system 1300 may also include additional sensors. For example, display system 1300 may comprise a global positioning system (GPS) subsystem 1316 to allow a location of the display system 1300 to be determined. This may help to identify real-world objects, such as buildings, etc. that may be located in the user's adjoining physical environment.

The display system 1300 may further include one or more motion sensors 1318 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1306. The use of motion data may allow changes in gaze location to be tracked even if image data from outward-facing image sensor(s) 1306 cannot be resolved.

In addition, motion sensors 1318, as well as microphone(s) 1308 and gaze detection subsystem 1310, also may be employed as user input devices, such that a user may interact with the display system 1300 via gestures of the eye, neck and/or head, as well as via verbal commands in some cases. It may be understood that sensors illustrated in FIGS. 13 and 14 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1300 can further include a controller 1320 having a logic subsystem 1322 and a data storage subsystem 1324 in communication with the sensors, gaze detection subsystem 1310, display subsystem 1304, and/or other components through a communications subsystem 1326. The communications subsystem 1326 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1324 may include instructions stored thereon that are executable by logic subsystem 1322, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1300 is configured with one or more audio transducers 1328 (e.g., speakers, earphones, etc.) so that audio can be utilized as part of a mixed reality or virtual reality experience. A power management subsystem 1330 may include one or more batteries 1332 and/or protection circuit modules (PCMs) and an associated charger interface 1334 and/or remote power interface for supplying power to components in the display system 1300.

It may be appreciated that the display system 1300 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 15:
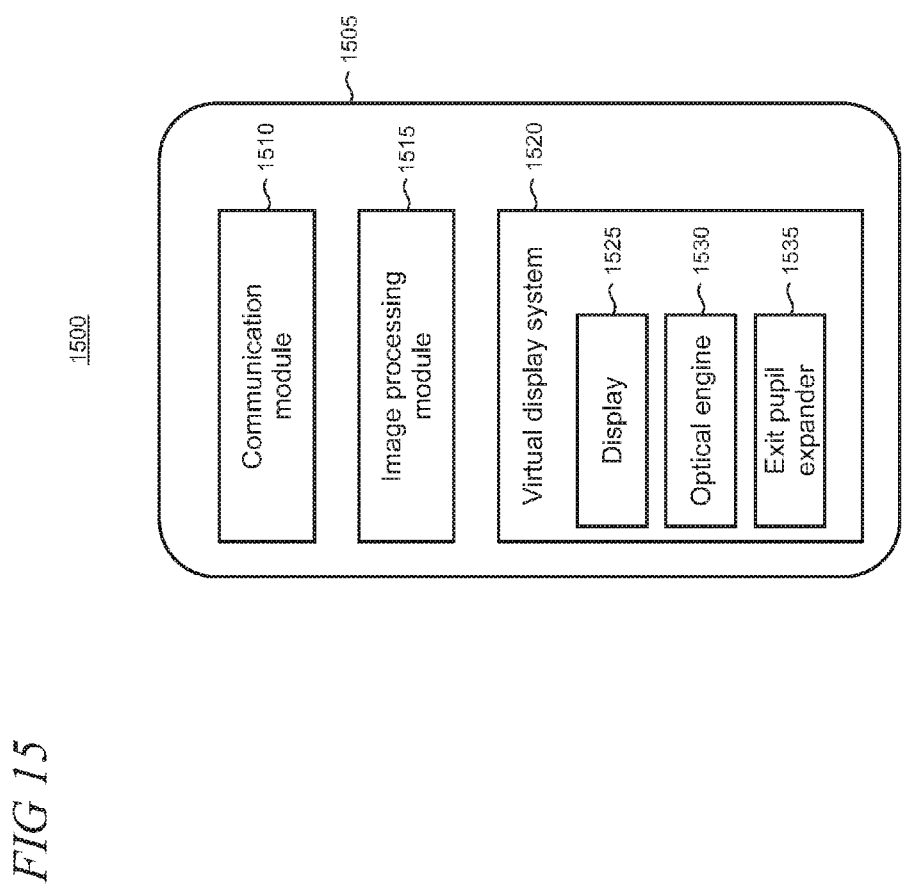
FIG. 15 shows a block diagram of an illustrative electronic device that incorporates an exit pupil expander.

As shown in FIG. 15, optical display systems using wide-spectrum imaging can be used in a mobile or portable electronic device 1500, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1500 includes a housing 1505 to house a communication module 1510 for receiving and transmitting information from and to an external device, or a remote system or service (not shown).

The portable device 1500 may also include an image processing module 1515 for handling the received and transmitted information, and a virtual display system 1520 to support viewing of images. The virtual display system 1520 can include a micro-display or an imager 1525 (such as the wide-spectrum imager 105, described above) and an optical engine 1530. The image processing module 1515 may be operatively connected to the optical engine 1530 to provide image data, such as video data, to the imager 1525 to display an image thereon. An EPE 1535 can be optically linked to an optical engine 1530. The EPE may incorporate or be part of a system that includes the wide-spectrum imager.

Optical display systems using wide-spectrum imaging may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present extended field of view in near-eye display using wide-spectrum imager are now presented by way of illustration and not as an exhaustive list of all embodiments. An example includes a display system, comprising: an imager configured to generate imaging light using a variable spectrum across a field of view (FOV) of an input pupil; a substrate of optical material that includes a waveguide; an in-coupling diffractive optical element (DOE) disposed on the substrate, the in-coupling DOE having an input surface configured to receive incident imaging light over the input pupil; and an out-coupling DOE disposed on the substrate, the out-coupling DOE having an output surface and configured for pupil expansion of the imaging light in one direction, and further configured to out-couple, as an output display from the output surface, the imaging light with expanded exit pupil relative to the input pupil, wherein the in-coupling DOE is configured to spread the spectrum of imaging light over the input pupil FOV so that at least a part of the spectrum propagates in total internal reflection in the waveguide for each portion of the FOV.

In another example, the display system further comprises an intermediate DOE disposed on the substrate and located downstream from the in-coupling DOE and upstream from the out-coupling DOE, the intermediate DOE configured for pupil expansion in a different direction from the out-coupling DOE. In another example, a short portion of the spectrum fills a first portion of the input pupil FOV and a long portion of the spectrum fills a second portion of the input pupil FOV. In another example, chromatic dispersion in the in-coupling DOE causes spectral propagation angles of the imaging light in the waveguide to vary with wavelength, and chromatic dispersion in the out-coupling DOE causes the out-coupled imaging light to have parallel angles with respect to the incident imaging light. In another example, the imager comprises a wide-spectrum imager configured to provide illumination over a wavelength bandwidth of about 40 nm.

A further example includes an electronic device supporting a mixed reality experience including elements from a virtual world and elements from a real world, comprising: a data processing unit; an optical engine operatively connected to the data processing unit and configured to receive image data from the data processing unit; a wide-spectrum imager operatively connected to the optical engine to form images using a predetermined optical spectrum based on the image data and to generate imaging light that incorporates the images; and an exit pupil expander, responsive to the imaging light received over an input pupil having a field of view (FOV), comprising a structure on which multiple diffractive optical elements (DOEs) are disposed, wherein the exit pupil expander is configured to provide one or more out-coupled optical beams, using one or more of the DOEs, as a near-eye display with an expanded exit pupil relative to the input pupil, and wherein different parts of the spectrum of the imaging light are utilized for different regions of the FOV of the input pupil.

In another example, the wide-spectrum imager is configured so that a particular wavelength of the imaging light that is capable of propagation within the exit pupil expander in total internal reflection at a given angle of the FOV is utilized for the region of the FOV that includes the given angle. In another example, the exit pupil expander provides pupil expansion in two directions. In another example, the wide-spectrum imager includes one of light emitting diode, liquid crystal on silicon device, organic light emitting diode array, or micro-electro mechanical system device. In another example, the wide-spectrum imager comprises a microdisplay operating in one of transmission, reflection, or emission. In another example, the electronic device is implemented in a head mounted display device or portable electronic device. In another example, the wide-spectrum imager includes or incorporates an illumination unit. In another example, the wide-spectrum imager provides varies the optical spectrum over the FOV. In another example, the wide-spectrum imager is configured so that at least a portion of the spectrum is propagated in total internal reflection for each portion of the FOV.

A further example includes a method, comprising: operating a wide-spectrum imager configured to produce imaging light over a predetermined range of wavelengths; receiving the imaging light over an input pupil having a field of view (FOV) at an in-coupling diffractive optical element (DOE) disposed in an exit pupil expander; expanding an exit pupil of the received imaging light along a first coordinate axis in an intermediate DOE disposed in the exit pupil expander; expanding the exit pupil along a second coordinate axis in an out-coupling DOE disposed in the exit pupil expander; and outputting imaging light in a display with an expanded exit pupil relative to the input pupil along the first and second coordinate axes using the out-coupling DOE, wherein the in-coupling DOE is configured to cause chromatic dispersion in the received imaging light and the out-coupling DOE is configured to cause chromatic dispersion in the output imaging light in an opposite direction to that caused in the in-coupling DOE.

In another example, the predetermined range of wavelengths covers at least 40 nm. In another example, the predetermined range of wavelengths has sufficient width so that at least a portion of spectrum is capable of propagation in the exit pupil expander in total internal reflection over the entirety of the FOV of the input pupil. In another example, the imager is further configured so that the imaging light spectrum is varied over the FOV of the input pupil so that only a portion of the spectrum that is capable of propagation within the exit pupil expander in total internal reflection at each angle of the FOV is utilized for a region of the FOV that includes that angle. In another example, the method is performed in a near-eye display system. In another example, the output imaging light provides a virtual display to a user of the near-eye display system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A display system, comprising:
    an imager configured to generate imaging light using a variable spectrum across a field of view (FOV) of an input pupil;
    a substrate of optical material that includes a waveguide;
    an in-coupling diffractive optical element (DOE) disposed on the substrate, the in-coupling DOE having an input surface configured to receive incident imaging light over the input pupil; and
    an out-coupling DOE disposed on the substrate, the out-coupling DOE having an output surface and configured for pupil expansion of the imaging light in one direction, and further configured to out-couple, as an output display from the output surface, the imaging light with expanded exit pupil relative to the input pupil,
        wherein the in-coupling DOE is configured to spread the spectrum of imaging light over the input pupil FOV so that at least a part of the spectrum propagates in total internal reflection in the waveguide for each portion of the FOV.

2. The display system of claim 1 further comprising an intermediate DOE disposed on the substrate and located downstream from the in-coupling DOE and upstream from the out-coupling DOE, the intermediate DOE configured for pupil expansion in a different direction from the out-coupling DOE.

3. The display system of claim 1 in which a short portion of the spectrum fills a first portion of the input pupil FOV and a long portion of the spectrum fills a second portion of the input pupil FOV.

4. The display system of claim 1 in which chromatic dispersion in the in-coupling DOE causes spectral propagation angles of the imaging light in the waveguide to vary with wavelength, and chromatic dispersion in the out-coupling DOE causes the out-coupled imaging light to have parallel angles with respect to the incident imaging light.

5. The display system of claim 1 in which the imager comprises a wide-spectrum imager configured to provide illumination over a wavelength bandwidth of about 40 nm.

6. An electronic device supporting a mixed reality experience including elements from a virtual world and elements from a real world, comprising:
- a data processing unit;
- an optical engine operatively connected to the data processing unit and configured to receive image data from the data processing unit;
- a wide-spectrum imager operatively connected to the optical engine to form images using a predetermined optical spectrum based on the image data and to generate imaging light that incorporates the images; and
- an exit pupil expander, responsive to the imaging light received over an input pupil having a field of view (FOV), comprising a structure on which multiple diffractive optical elements (DOEs) are disposed,
  - wherein the exit pupil expander is configured to provide one or more out-coupled optical beams, using one or more of the DOEs, as a near-eye display with an expanded exit pupil relative to the input pupil, and
  - wherein different parts of the spectrum of the imaging light are utilized for different regions of the FOV of the input pupil.

7. The electronic device of claim 6 in which the wide-spectrum imager is configured so that a particular wavelength of the imaging light that is capable of propagation within the exit pupil expander in total internal reflection at a given angle of the FOV is utilized for the region of the FOV that includes the given angle.

8. The electronic device of claim 6 in which the exit pupil expander provides pupil expansion in two directions.

9. The electronic device of claim 6 in which the wide-spectrum imager includes one of light emitting diode, liquid crystal on silicon device, organic light emitting diode array, or micro-electro mechanical system device.

10. The electronic device of claim 6 in which the wide-spectrum imager comprises a micro-display operating in one of transmission, reflection, or emission.

11. The electronic device of claim 6 as implemented in a head mounted display device or portable electronic device.

12. The electronic device of claim 6 in which the wide-spectrum imager includes or incorporates an illumination unit.

13. The electronic device of claim 6 in which the wide-spectrum imager varies the optical spectrum over the FOV.

14. The electronic device of claim 6 in which the wide-spectrum imager is configured so that at least a portion of the spectrum is propagated in total internal reflection for each portion of the FOV.

15. A method, comprising:
- operating a wide-spectrum imager configured to produce imaging light over a predetermined range of wavelengths;
- receiving the imaging light over an input pupil having a field of view (FOV) at an in-coupling diffractive optical element (DOE) disposed in an exit pupil expander;
- expanding an exit pupil of the received imaging light along a first coordinate axis in an intermediate DOE disposed in the exit pupil expander;
- expanding the exit pupil along a second coordinate axis in an out-coupling DOE disposed in the exit pupil expander; and
- outputting imaging light in a display with an expanded exit pupil relative to the input pupil along the first and second coordinate axes using the out-coupling DOE,
  - wherein the in-coupling DOE is configured to cause chromatic dispersion in the received imaging light and the out-coupling DOE is configured to cause chromatic dispersion in the output imaging light in an opposite direction to that caused in the in-coupling DOE.

16. The method of claim 15 in which the predetermined range of wavelengths covers at least 40 nm.

17. The method of claim 15 in which the predetermined range of wavelengths has sufficient width so that at least a portion of spectrum is capable of propagation in the exit pupil expander in total internal reflection over the entirety of the FOV of the input pupil.

18. The method of claim 15 in which the imager is further configured so that the imaging light spectrum is varied over the FOV of the input pupil so that only a portion of the spectrum that is capable of propagation within the exit pupil expander in total internal reflection at each angle of the FOV is utilized for a region of the FOV that includes that angle.

19. The method of claim 15 as performed in a near-eye display system.

20. The method of claim 15 in which the output imaging light provides a virtual display to a user of the near-eye display system.

\* \* \* \* \*